United States Patent Office 3,515,675 Patented June 2, 1970

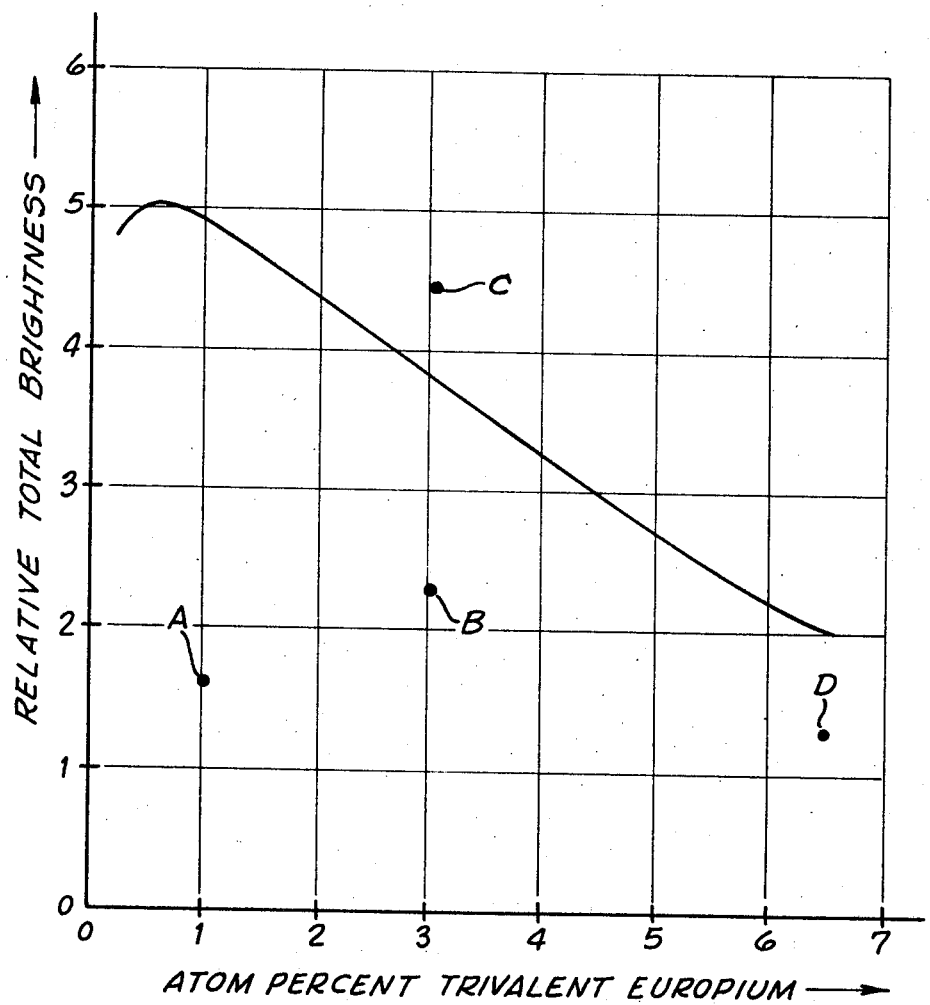

3,515,675
METHOD FOR MAKING LUMINESCENT MATERIALS
William H. Byler, Morristown, and James J. Mattis, Dover, N.J., Stanley A. Ring, Palo Alto, Leon E. Sobon, Los Altos, Melvin Tecotzky, Palo Alto, and Kenneth A. Wickersheim, Mountain View, Calif., assignors to Lockheed Aircraft Corporation, Los Angeles, Calif.
Filed Dec. 27, 1966, Ser. No. 604,784
Int. Cl. C09k 1/14
U.S. Cl. 252—301.4
9 Claims

ABSTRACT OF THE DISCLOSURE

A method for making europium activated lanthanum oxysulfide phosphors useful as red cathodoluminescent phosphors and as fluorescent and high pressure mercury vapor lamp phosphors. A solution containing as the solute rare earth lanthanum and europium ions is reacted with a precipitation agent to form a crystalline precipitate; for example, a hydrochloric acid solution is reacted with oxalic acid to form rare earth oxalate. The precipitate is calcined to the oxide. The oxide is converted to crystalline, rare earth oxysulfide by heating the oxide in a controlled atmosphere containing as the reactive constituent a gas mixture yielding under elevated temperatures hydrogen, sulfur and oxygen.

CROSS-REFERENCES TO RELATED APPLICATIONS

This invention relates to a method for producing the lanthanum base luminescent oxysulfide compositions of matter disclosed in co-pending U.S. patent application Ser. No. 575,922 filed Aug. 22, 1966.

BACKGROUND OF THE INVENTION

As described in the co-pending application, it has been discovered that certain lanthanum base oxysulfide compositions exhibit the unique property of producing under electron beam and ultraviolet excitations a primary luminescence having a red emission or an emission containing a strong red component. The emission color, emission brightness and intensity of the red component portion of the emission are dependent on the europium concentration in the composition, with maximum red color occurring at the higher europium concentrations, maximum brightness occurring at the lower europium concentrations and maximum red component intensity occurring at the intermediate europium concentrations. These characteristics make the composition of particular value as red cathodoluminescent phosphors and as phosphors for use in lighting devices such as fluorescent lamps and high pressure mercury vapor lamps.

U.S. Pat. 2,729,605 issued Jan. 3, 1956 to Swindells, states that although various lanthanum compounds having luminescent properties are previously known, they have not enjoyed commercial use. Among such phosphors discussed by Swindells are infra-red stimulable lanthanum oxysulfide storage phosphors emitting primarily in the yellow or green region and activated with a variety of double activator combinations (U.S. Pat. 2,462,547 issued Feb. 22, 1949 to Pitha and Ward). Although Pat. 2,462,547 does not disclose the compositions of the aforementioned co-pending patent application, the process detailed therein is to applicants' knowledge the only known process for making activated phosphors of the lanthanum base oxysulfide type. Tests conducted by applicants have shown, however, that this process cannot be utilized to form compositions having the properties set forth in the aforementioned co-pending patent application. In particular it was found that the process resulted in segregation of the host and activator ions, in the formation of extraneous, non-oxysulfide phases in the resulting oxysulfide crystals and could not be controlled as to size and size distribution of the crystals. The mixed crystals exhibited under cathodoluminescent and ultraviolet excitations poor brightness and non-uniform color. The process further could not be controlled as to final crystal sizes but rather formed randomly-sized crystals unsuitable for use in many applications, for example, as cathodoluminescent phosphors.

SUMMARY OF THE INVENTION

Briefly, in accordance with the invention, there is described a process for making a luminescent composition of matter having the characteristics and properties set forth in co-pending U.S. patent application Ser. No. 575,922. The composition has the empirical formula.

$$(La_{1-x}A_x)_2O_2S$$

where A is is at least one trivalent rare earth ion selected from the group consisting of europium or europium and samarium and $x$ has a value of from about 0.01 to 0.09, but where A is europium and samarium, samarium is present in an amount up to about 0.01, with the maximum samarium inclusion of 0.01 requiring a minimum value for $x$ of about 0.03. Optionally, up to about 0.1 of the lanthanum ions may be replaced by gadolinium and yttrium ions.

The subscripts in the above formula signify the relative number of gram atoms of the elements indicated which are present and thus are also proportional to the relative number of atoms of each element present in the composition. On an atom percent basis, this corresponds to a composition in which from about 1 atom percent to 9 atom percent of the lanthanum ions have been replaced by trivalent europium ions and optionally up to 1 atom percent of the lanthanum ions have been replaced by trivalent samarium ions. Within this range and based on the necessity of retaining a useable europium emission, the amounts of europium and samarium ions in the compositions are interrelated with the larger europium concentration permitting the larger samarium inclusions with no substantial detriment to europium emission. Conversely, the smaller the europium concentration the smaller the tolerable samarium inclusion. It has been determined that the maximum samarium inclusion in the composition of about 0.01 (1 atom percent) requires $x$ in the formula to be at least about 0.03 (3 atom percent); that is, a useable europium emission is exhibited by a composition containing about 2 atom percent europium and 1 atom percent samarium. Increasing the europium concentration above 2 atom percent does not permit the use of samarium inclusions above about 1 atom percent. However, europium concentrations below 2 atom percent permit samarium inclusions less than 1 atom percent.

As further discussed in the aforementioned co-pending patent application, the lanthanum oxysulfide structure is quite unique among inorganic rare earth compounds in that it is the same structure as that found for the oxysulfides of yttrium and gadolinium. In contrast, such large changes in ionic radius with atomic number usually leads to the stabilizing of different structures for different rare earths. For example, the rare earth oxides of the formula $RE_2O_3$ have at least three well-defined but dissimilar structures: lanthanum oxide is hexagonal; yttrium oxide is cubic; and samarium oxide is monoclinic. By virtue of the structural similarity of the oxysulfides, complete solid solutions therebetween can be formed. As such, up to 10 atom percent of the lanthanum ions can be replaced by yttrium and gadolinium ions without serious deterioration of performance and price of the lanthanum oxysulfide phosphors.

More particularly, the methods of the invention involve forming a crystalline precipitate containing the desired rare earth activator and host ions, calcining the precipitate to the corresponding crystalline oxide and converting the oxide to the corresponding crystalline oxysulfide by heating the oxide in a controlled atmosphere containing as reactive constituents hydrogen, sulfur and oxygen.

In a preferred embodiment of the invention, the crystalline precipitate prior to calcining undergoes a caustic treatment resulting in enhanced brightness characteristics for the final oxysulfide crystals and controlled crystalline growth during calcining.

It has been determined that the efficacy of the process is dependent upon the specified sequence of processing steps. The precipitation step is required to obtain stoichiometric crystals of the desired rare earth ions and further permits some control over the size of the oxide crystals since, even in the absence of caustic treatment, size of the precipitate crystals has a bearing on size of the oxide crystals and thus on size of the final oxysulfide crystals. Commensurate with the art, the size and size distribution of phosphor crystals are important in many applications and control thereof is necessary. For example, television phosphors generally require a 4 to 15 micron size to be effective.

The process is further dependent on and limited to the formation of an intermediate oxide phase prior to formation of the final oxysulfide crystals. Applicants have found it impossible to directly produce from the precipitate or otherwise, oxysulfide crystals of control size, stoichiometry and optical properties. The oxide is the only intermediate compound known to applicants that can be produced from the precipitate having the crystalline size, stoichiometry and optical properties necessary in the final phosphor and which is convertible to the oxysulfide without destroying these characteristics, for example, because of a structural change.

To transpose these characteristics from the oxide to the oxysulfide is difficult, however, and applicants have found that a final firing in the aforementioned controlled atmosphere is a necessary prerequisite to the obtaining of the desired oxysulfide phosphors. Applicants were not successful in utilizing only a hydrogen sulfide atmosphere since in this environment the sulfide rather than the oxysulfide is the normal, stable end product. Attempts to stop the reaction short of the sulfide phase were not successful; the resulting product departed from the required stoichiometry and contained both oxysulfide and sulfide phases.

It has been found that atmospheres containing oxygen in addition to hydrogen and sulfur result in an environment wherein oxysulfides rather than sulfides are the normal, stable end product. Tests conducted by applicants establish that the amount of oxygen required in the atmosphere is relatively unimportant and even small amounts of oxygen are suitable for establishing the required environment.

BRIEF DESCRIPTION OF THE DRAWING

The invention may be more easily understood by reference to the drawing which on coordinates of relative total brightness and atom percent trivalent europium is a plot showing the total brightness under cathode ray excitation of phosphors made by the process of the invention containing varying amounts of europium in accordance with the aforementioned empirical formula. This process involved precipitating the rare earth ions as oxalate crystals coupled with firing of the oxide crystals in a controlled atmosphere of hydrogen and sulfur dioxide. The process did not include the preferred caustic treatment of the invention.

As shown in the drawing, peak brightness is achieved in the 0.1 to 1 percent europium range with brightness thereafter decreasing with increasing europium concentrations. The brightness versus europium concentration curve of the compositions under 2537 Angstrom ultraviolet excitation is similar to that of the drawing. The brightness versus concentration curve of the composition under 3660 Angstrom excitation while similar to that of the drawing has been found to peak at somewhat higher europium concentrations.

For comparative purposes point A of the drawing shows the brightness under cathode ray excitation of a 1 percent europium containing lanthanum oxysulfide phosphor made in accordance with the process set forth in U.S. Pat. 2,462,547. As shown, the brightness of this phosphor is approximately 3 times less than the brightness of a comparable phosphor made by the process of the invention. Point B of the drawing shows the brightness under cathode ray excitation of a 3 percent europium containing lanthanum oxysulfide phosphor made by a process utilizing the controlled atmosphere firing step of the invention, but omitting the required precipitation to oxide conversion step of the invention. As shown, the brightness of this phosphor is approximately 1.7 times less than the brightness of a comparable phosphor made by the process of the invention.

Point C of the drawing shows the brightness under cathode ray excitation of a 3 percent europium containing lanthanum oxysulfide phosphor made in accordance with the preferred embodiment of the invention wherein the oxalate crystals prior to calcining undergo a caustic treatment. As shown, the brightness of this phosphor is superior to the non-caustic treated phosphors of the invention. As will be subsequently discussed, this superior brightness is due to the presence of alkali ions in the phosphor resulting from absorption of caustic by the oxalate crystals during the custic treatment. It has been found that point C is indicative of the margin of brightness advantage realized by caustic treated crystals of the invention as compared to the non-caustic treated crystals.

Point D of the drawing shows the brightness under cathode ray excitation of a 6.5 percent europium containing phosphor made by a process utilizing the precipitation to oxide conversion step of the invention but omitting the required controlled atmosphere firing step. In its place was substituted a final firing in only hydrogen sulfide. As shown, this phosphor has a brightness 1.6 times less than the brightness of a comparable phosphor subjected to a final firing in the controlled atmosphere of the invention.

To obtain the cathodoluminescent properties depicted in the drawing, phosphor samples were packed into a recessed metal holder with particular attention being paid to the obtaining of a smooth surface. The sample holder was mounted on a pivoted mount in an evacuable system complete with electron gun assembly (an electrostatically-focused oscilloscope gun), viewing ports and provision for introducing high post acceleration voltages at the sampler holder. The electron beam was adjusted so as to illuminate a specific area of the sample. The emission from the sample was passed either into a Cary Model 14 spectrophotometer equipped with a red sensitive Hamamatsu R–136 photomultiplier or into a second photometric system utilizing a number 11 and a number 15 Wratten filter in combination with the R–136 photomultiplier to record eye brightness of the total emission, both measurements being recorded in arbitrary intensity units. Typical operating conditions were: 9 kv. electron voltage; 0.7 microamps beam current; and 0.025 watts/$cm.^2$ electron power density at the sample.

DESCRIPTION OF THE PREFERRED EMBODIMENTS

The formation of a crystalline precipitate containing the desired rare earth host and activator ions in stoichiometric proportions is readily accomplished by techniques conventional in the art. Since the conversion of the precipitate to the oxide is a required step in applicants' process, the precipitate must be so convertible under calcining conditions without formation of extraneous, non-oxide phases and without segregation of the host and activator ions.

Precipitation is accomplished from a solution containing as the solute the desired rare earth host and activator ions. The particular choice of solvent and rare earth ion containing compounds utilized to form the solution is considered within the skill of the art with the understanding that the solvent dissolves such compounds without forming a precipitate that removes the rare earth ions from solution. Illustrative of the rare earth ion-containing compounds are the oxides, sulfates, nitrates and chlorides. The relative insolubility of the rare earth oxides preferably dictates the use of acid solvents, for example, inorganic mineral acids such as hydrochloric acid, sulfuric acid and nitric acid. There is no critical limit to the particle size of the rare earth ion-containing compounds since they are dissolved by the solvent.

The choice of precipitation agent to be reacted with the rare earth ion-containing solution is considered obvious to one skilled in the art in view of the teachings contained herein. As discussed a crystalline precipitate must be formed and segregation of the host and activator ions must be avoided both during precipitation and conversion of the precipitate to the oxide during subsequent calcining. The following precipitation technique is accordingly considered illustrative of the many such techniques that may be utilized in practicing the invention.

A stock solution of 0.5 molar lanthanum chloride and a stock solution of 1.0 molar europium chloride was prepared by separately weighing lanthanum oxide and europium oxide and slurrying each with deionized or distilled water. To each slurry was added sufficient 1 to 1 hydrochloric acid to dissolve the oxide. The use of an excess of acid does not appear to be detrimental. Since heat is produced upon addition of the acid to the oxide, the use of the oxide slurry is a convenient although not required method of minimizing such heat of reaction. Additionally, to ensure consistent results the oxide powders were prefired prior to weighing since they are hygroscopic.

The pH of each solution was then determined and to ensure consistent results during subsequent processing was adjusted to a value between about 1 to 5 and preferably between about 2 to 5. A lower pH value has been found to detract from complete precipitation since highly acidic solutions tend to redissolve the precipitate. At higher pH values a basic rare earth precipitate may form via hydrolysis to the detriment of complete rare earth precipitation. The particular agent used to adjust the pH value is considered to be within the skill of the art. Applicants typically use ammonium hydroxide, for example, since it is removed by volatilization during subsequent processing. After adjustment of pH values, the solutions were then diluted to volume with distilled water to form, in this instance, 0.5 molar lanthanum chloride and 1 molar europium chloride solutions. Proper quantities of the two solutions were mixed together to obtain a master solution containing the desired concentration of host and activator ions.

Precipitation of the rare earth ions from the master solution was accomplished by oxalic acid additions thereto in amounts at least sufficient to fully precipitate the rare earth ions in the form of oxalate crystals. For convenience in ensuring complete precipitation, applicants have utilized a 10 percent stock solution of oxalic acid in amounts up to a 20 percent excess of that required for precipitation. Larger amounts of oxalic acid could be utilized since it is a weak acid and accordingly has only a minimal effect on pH value. However, over-all costs of the process would be correspondingly increased. A 10 percent oxalic acid solution was utilized since it is the practical maximum solubility of the acid in water at room temperature. Weaker solutions are permissible although somewhat inefficient in that larger volumes of solution are then required for complete precipitation.

In carrying out the precipitation step it has been found desirable to maintain the solution at constant temperature. This ensures consistent results from batch to batch since it has been found that variations in temperature affect size of the precipitate crystals with increasing temperatures favoring larger crystals. For convenience applicants generally operate in the range of from 30° to 60° C. such temperatures being readily and economically obtainable. The rate at which the precipitation agent and the rare earth ion-containing solution are mixed and reacted is also determinative of crystal size with increasing mixing and reaction times favoring larger crystals and greater uniformity in size distribution.

The precipitate is then filtered from solution. Although not required, it has been found that drying the filtered precipitate prior to calcining favors better crystal development during calcining. A drying schedule of, for example, 150° C. to 500° C. for one-half to sixteen hours has been found satisfactory.

The precipitate crystals are then calcined to the corresponding oxide or in accordance with the preferred embodiment of the invention undergo a caustic treatment prior to calcining. When the precipitate crystals are directly converted to the oxide, it has been determined that there is a direct correlation between the size of the precipitate crystals and the size of the oxide crystals, which correlation can be readily determined by one skilled in the art.

The caustic treatment involves mixing the filtered precipitate crystals with a caustic solution. Caustic is adsorbed both externally and internally by the crystals and breakdown of the crystals into smaller units occurs due to conversion of a portion of the precipitate crystals to rare earth caustic. Depending on the caustic concentration and reaction time utilized, more adsorption and breakdown of the crystals occurs ultimately resulting in small caustic-coated crystals containing adsorbed caustic.

During calcining the adsorbed caustic beneficially acts as a flux promoting controlled crystal growth of the small crystals due to the good distribution of flux in the crystalline system. Additionally, the external caustic coating minimizes agglomeration of the growing crystals during calcining. In contrast, it has been found that direct treatment of small oxide crystals with caustic does not produce noticeable crystalline growth during calcining.

The limiting factor on the caustic treatment is the degree to conversion of rare earth precipitate to rare earth caustic. Although both compositions convert to the oxide on calcining, it has been found that precipitate to caustic conversions of 25 percent and greater result in a poor quality oxysulfide phosphor of diminished brightness. Preferably, the amount of conversion during the caustic treatment is 20 percent or less. Such conversion is naturally dependent on the concentration of the caustic solution and the length of reaction time, with adjustment of these parameters in accordance with the preceding discussion being within the skill of the art.

Exemplary of one caustic treatment schedule, applicants have found it convenient to treat 375 gram batches of oxide equivalent weight of oxalate for 40 minutes in a caustic solution formed by diluting an amount of anhydrous caustic equal to 25 percent of the weight as equivalent oxide to form a 4 percent caustic solution, based on the total water present. Although any caustic treatment is beneficial in view of the preceding discussion, practical considerations desirably dictate for this caustic schedule the use of a 1 percent caustic solution formed by diluting an amount of anhydrous caustic equal to 6 percent of the equivalent weight. As caustics, sodium hydroxide, potassium hydroxide and lithium hydroxide are typically used because of their economical costs; however, other suitable caustics are apparent to those skilled in the art.

Upon completion of the caustic treatment, the crystals are filtered from solution, optionally washed to remove caustic that is not adsorbed on or in the crystals and dried in similar fashion to the non-caustic treated crystals. To ensure reproducible results during the caustic treatment, applicants have found it desirable, although not mandatory, to wash the filtered precipitate crystals prior to the caustic treatment. The washing in distilled or deionized water, removes any residual acid from the crystals, thereby preventing any tendency for reaction between the caustic and the acid, such reaction removing some caustic from solution, for example, in the form of sodium oxalate.

Calcining of both the caustic and non-caustic treated crystals is conducted by conventional techniques. Applicants have found a 1185° C. heat treatment for 3 hours to be satisfactory in fully converting the caustic treated crystals to the corresponding oxide. More rigorous treatments are permissible and generally desirable for the non-caustic treated crystals and limited only by economic considerations and the volatilization temperature of europium. After calcining, the oxide crystals resulting from the caustic treated oxalate crystals are washed with distilled or deionized water to remove excess caustic still adsorbed on the crystalline surfaces. This washing ensures full uniform contact of the crystalline oxide surfaces with the controlled atmosphere in the subsequent firing step, thereby permitting uniform conversion of the oxide to the oxysulfide. Such washing is generally followed by a drying step, for example, heating at 175° C. for one hour to remove the wash water prior to final firing.

The oxide is then converted to the corresponding oxysulfide by heating the oxide in a controlled atmosphere containing as reactive constituents at the elevated temperatures utilized hydrogen, sulfur and oxygen. Naturally, many gas mixtures yield these constituents at elevated temperatures; however, it is considered within the skill of the art to establish by routine experimentation the most suitable atmospheres since, as previously discussed, the essence of the firing step is the discovery that the inclusion of oxygen in atmospheres containing hydrogen and sulfur is a necessary prerequisite to the obtaining of the desired oxysulfide phosphors.

Illustrative of the various suitable atmospheres are those atmospheres containing as the active constituents hydrogen sulfide plus sulfur dioxide; hydrogen sulfide plus water vapor; and hydrogen plus sulfur dioxide. These atmospheres have been evaluated by applicants and found satisfactory. The investigation also established that the amount of oxygen required in the atmosphere is relatively unimportant and even small amounts thereof are suitable for establishing the required environment. For example, in one test exemplary of these atmospheres, applicants varied the volume ratio of hydrogen sulfide to sulfur dioxide from 1:1 to 11:1 and found all oxysulfide phosphors so formed satisfactory. The same test established that an atmosphere containing only hydrogen sulfide gave an unsatisfactory phosphor. The results of the tests further showed that the amount of the oxygen-containing gas could be lowered below the 11:1 ratio with no deleterious effect on the final product. Among the other potentially suitable atmospheres that will occur to those skilled in the art is for example sulfur vapor plus water vapor.

Conversion of the oxide to oxysulfide occurs at temperatures in the order of 1000° C. It has been found that reaction temperature affects brightness of the formed oxysulfide crystals with increasing temperatures up to about 1100° C. resulting in increases in brightness, Above about 1100° C. increase in brightness is not significant. For those applications requiring maximum brightness temperatures of at least 1100° C. are preferred, therefor. Maximum temperatures are limited only by economic considerations and the volatilization temperature of europium.

Reaction time is important only insofar as complete conversion of the oxide to the stable oxysulfide occurs. Although prolonged reaction times may lead to over sulfidization resulting in formation of extraneous rare earth sulfide phases, this condition is readily determined by the brown color of the sulfide phase as contrasted to the beige color of the oxysulfide crystals.

It has been found that there is a tendency for more uniform crystal development when the reaction between the oxide and the controlled atmosphere is moderated by including in the controlled, reactive atmosphere an inert gas such as nitrogen, argon and the like. Applicants have conveniently utilized inert gases in amounts up to 100 volume percent of the controlled atmosphere used, resulting in atmospheres containing 50 volume percent inert gas and 50 volume percent controlled reactive atmosphere. Larger volumes of inert gas, although permissible, require longer reaction times to convert the oxide to the oxysulfide. Within the temperature limits previously set forth applicants have found it convenient to utilize reaction times in the order of 30 minutes to 2 hours when processing 375 gram batches in atmospheres containing 50 volume percent inert gas.

After conversion of the oxide crystals to oxysulfide crystals, the oxysulfide crystals are cooled to room temperature. Applicants prefer to conduct the cooling in a 100 percent inert atmosphere to prevent any tendency of the oxysulfide material to partially oxidize to oxysulfate. Likewise, applicants have found it desirable, although not mandatory, to initially heat the oxide in a 100 percent inert atmosphere prior to reaction in the controlled atmosphere. 375 gram batches are heated for 30 minutes at the aforementioned temperatures although longer times are permissible and not critical. This heating ensures that any residual amounts of rare earth caustic are fully converted to rare earth oxide thereby preventing competing reactions during the oxide to oxysulfide conversion step which otherwise might hinder crystal development.

Referring again to point C of the drawing, it was previously noted that the superior brightness exhibited by this composition is due to the presence of alkali ions such as sodium, potassium and lithium in the composition, such ions resulting from adsorption of caustic by the oxalate crystals during the caustic treatment. It has been determined by applicants that brightness increases as the concentration of alkali ion is increased in the crystals in the range below 0.3 percent by weight. Inclusions above this amount result in a decrease in brightness. The concentration of alkali ion in the crystals is dependent upon the amount of adsorption during the caustic treatment less the amount of alkali ion removed during subsequent processing steps, for example, by the optional washing steps. It is considered within the skill of the art to adjust the aforementioned processing parameters to result in oxysulfide crystals containing alkali metal ions in amounts less than 0.3 percent by weight.

Specific examples of procedures used in the preparation of luminescent materials of the invention are given below. These examples are to be construed as illustrative only and not as limiting in any manner the scope of the invention as defined by the appended claims.

EXAMPLE 1

A 6 atom percent europium containing lanthanum oxysulfide phosphor having the characteristics depicted by the plot shown in the drawing was prepared by separately prefiring $La_2O_3$ and $Eu_2O_3$ for four hours at 1000° C. After firing, 102.2 grams of $La_2O_3$ and 7 grams of $Eu_2O_3$ were placed in a beaker and slurried with 60 ml. of water. 190 ml. of concentrated hydrochloric acid was added to the slurry with stirring to dissolve the oxides. The pH of the solution was adjusted to 2 with ammonium hydroxide and the solution then added to an oxalate solution at 50° C. containing 250 grams oxalic acid in 2500 ml. water. The resulting solution containing rare earth oxalate precipitate was stirred at temperature, 50° C., for one hour, and then cooled to room temperature and filtered. The oxalate precipitate was dried overnight at 150° C.

The dried oxalate was calcined to the oxide at 1250° C. for 8 hours. The resulting oxide was placed in an alumina boat inside a quartz boat and the quartz boat placed in a quartz reaction tube in a tube furnace at a temperature of 1050° C. The tube was then purged with argon gas for ten minutes, the flow rate being 8 cubic feet per minute. After purging, hydrogen and sulfur dioxide were introduced into the tube, the flow rates being respectively, 7.42 and 1.58 cubic feet per minute. After one hour, at temperature, 1050° C., argon was introduced into the tube and the hydrogen-sulfur dioxide flow stopped. The formed rare earth oxysulfide crystals were then cooled in the argon atmosphere in the cool zone of the furnace to room temperature.

EXAMPLE 2

A 6.5 atom percent europium containing lanthanum oxysulfide phosphor having the characteristics depicted by point D of the drawing was prepared by separately pre-firing $La_2O_3$ and $Eu_2O_3$ for four hours at 1000° C. 1424 ml. of lanthanum chloride solution of pH 2 containing the equivalent of 116.247 grams of the fired $La_2O_3$ was mixed with 50.77 ml. of europium chloride solution of pH 2 containing the equivalent of 8.753 grams of the fired $Eu_2O_3$ in a beaker. The mixed rare earth chloride solution was then heated to 50° C. 1675 ml. of 10 percent oxalic acid solution was added to the mixed rare earth chloride solution over a period of 10 minutes, the amount of oxalic acid solution being a 20 percent excess over that required for oxalate precipitation. The resulting solution containing rare earth oxalate precipitate was stirred for 2 hours at 50° C. temperature. The solution was then cooled and the precipitate filtered with suction using a Buchner funnel and Whatman No. 541 filter paper.

The oxalate precipitate was slurried in 625 ml. of water and to the slurry was added a sodium hydroxide solution containing 25 grams anhydrous sodium hydroxide in 125 ml. of water. The mixture was stirred for 30 minutes and the oxalate precipitate filtered as before and washed on the filter three times with 166 ml. of water. The oxalate was then dried overnight at 150° C. The dried oxalate was calcined for 2 hours at 1250° C. in air and then slurried in 200 ml. of water and the water decanted. The oxide was slurried again in 150 ml. of water and the water decanted. The oxide was then dried at 150° C. for 15 minutes and passed through a 325 mesh sieve. The sieved oxide was placed in an alumina boat inside a quartz reaction tube in a tube furnace at a temperature of 1080° C. The tube was purged with argon for 10 minutes at a flow rate of 8 cubic feet per minute. Hydrogen sulfide was then introduced into the tube at a flow rate of 0.1 cubic feet per minute for 30 minutes, 0.2 cubic feet per minute for 30 minutes and 0.4 cubic feet per minute for 30 minutes. The hydrogen sulfide flow was then stopped. The formed oxysulfide crystals were kept in the argon atmosphere in the hot zone of the furnace for an additional 10 minutes and then moved to the cool zone of the furnace and cooled to room temperature in the argon atmosphere.

EXAMPLE 3

A 3 atom percent europium containing lanthanum oxysulfide phosphor having the characteristics depicted by point C of the drawing was prepared by mixing 4447 ml. of a 0.5 molar lanthanum chloride solution of pH 2 and 68 ml. of a 1 molar europium chloride solution of pH 2 to form a mixed rare earth chloride solution. The mixed solution was stirred and heated to 30° C. and 5030 ml. of 10 percent oxalic acid solution was added thereto with stirring. Stirring was continued for 10 minutes and the oxalate precipitate was then filtered by suction on a Buchner funnel. The precipitate was washed with 2500 ml. of water and reslurried in 1875 ml. of water. To the slurry was added a sodium hydroxide solution containing 93.75 grams anhydrous sodium hydroxide in 375 ml. of water. The mixture was stirred for 40 minutes. The oxalate precipitate was filtered as before, washed with 1000 ml. of water and dried for 5 hours at 600° F. The dried oxalate was then calcined for 3 hours at 2150° F. The calcined oxide was broken up by milling with water and stones, wet sieved through 200 mesh sieve, filtered as before and dried at 350° F. for 1 hour. The dried oxide was refired at 2050° F. for 2 hours.

The oxide was then placed in a silica dish which was inserted into a furnace at 2050° F. Argon was turned on at a flow rate of 10 liters per minute for 45 minutes. At the end of this time the argon flow rate was increased to 12 liters per minute and hydrogen sulfide at a flow rate of 8 liters per minute and sulfur dioxide at a flow rate of 4 liters per minute were introduced into the gas stream. After 20 minutes the hydrogen sulfide flow rate was increased to 9 liters per minute. At the end of 40 minutes the hydrogen sulfide and sulfur dioxide gas streams were shut off and the argon flow decreased to 10 liters per minute. At the end of 15 minutes the formed oxysulfide crystals were removed from the hot zone of the furnace, cooled to room temperature in argon then passed through a 325 mesh sieve.

EXAMPLE 4

A 3 atom percent europium containing lanthanum oxysulfide phosphor having the characteristics depicted by point B of the drawing was prepared by adding europium chloride solution to solid lanthanum oxide as a damp mix. The mixture was then dried at 350° F. for one hour and refired at 2050° F. for two hours. The sample was then sulfidized in accordance with the procedure described in conjunction with Example 3.

What is claimed is:
1. A method for making a composition of matter having the empirical formula $(La_{1-x}A_x)_2O_2S$, where A is at least one trivalent activator ion selected from the group consisting of europium and europium plus samarium, $x$ has a value of from about 0.01 to 0.09 but where A is europium and samarium, samarium is present in an amount up to about 0.01, with the maximum samarium inclusion of about 0.01 requiring a minimum value for $x$ of about 0.03, and up to about 0.1 of the host lanthanum ions have been replaced by at least one ion selected from the group consisting of yttrium and gadolinium ions, said process comprising the steps of:
   forming a crystalline precipitate containing said rare earth activator and host ions in concentrations in accordance with said formula;
   calcining said rare earth crystalline precipitate to rare earth crystalline oxide; and
   converting said rare earth oxide to rare earth crystalline oxysulfide by heating said oxide in a controlled atmosphere containing as the reactive constituent a gas mixture yielding under elevated temperatures hydrogen, sulfur and oxygen, said gas mixture being selected from the group consisting of hydrogen sulfide plus sulfur dioxide, hydrogen sulfide plus water vapor, and hydrogen plus sulfur dioxide.
2. A method in accordance with claim 1 wherein said crystalline precipitate is formed by reacting a precipitation agent with a solution containing as the solute said rare earth ions.
3. A method in accordance with claim 2 wherein said solution is an acid solution and said precipitation agent is oxalic acid, the resulting crystalline precipitate being rare earth oxalate.
4. A method in accordance with claim 3 wherein said acid solution has a pH value of from about 1 to 5.

5. A method for making a composition of matter having the eimpirical formula $(La_{1-x}A_x)_2O_2S$, where A is at least one trivalent activator ion selected from the group consisting of europium and europium plus samarium, $x$ has a value of from about 0.01 to 0.09 but where A is europium and samarium, samarium is present in an amount up to about 0.01, with the maximum samarium inclusion of about 0.01 requiring a minimum value for $x$ of about 0.03, and up to about 0.1 of the host lanthanum ions have been replaced by at least one ion selected from the group consisting of yttrium and gadolinium ions, said process comprising the steps of:

forming a crystalline precipitate containing said rare earth activator and host ions in concentrations in accordance with said formula, said precipitate being calcinable to an oxide;

mixing said rare earth crystalline precipitate with an alkali metal hydroxide, to convert up to 25 weight percent of said precipitate to rare earth caustic;

calcining said treated rare earth crystalline precipitate to rare earth crystalline oxide; and converting said rare earth oxide to rare earth crystalline oxysulfide by heating said oxide in a controlled atmosphere containing as the reactive constituent a gas mixture yielding under elevated temperatures hydrogen, sulfur and oxygen.

6. A method in accordance with claim 5 wherein said rare earth crystalline oxide is washed with water prior to conversion of said oxide to said oxysulfide.

7. A method in accordance with claim 6 wherein said caustic solution is selected from the group consisting of sodium hydroxide, potassium hydroxide and lithium hydroxide.

8. A luminescent composition of matter having the empirical formula $(La_{1-x}A_x)_2O_2S$, where A is at least one trivalent activator ion selected from the group consisting of europium and europium plus samarium, $x$ has a value of from about 0.01 to 0.09 but where A is europium and samarium, samarium is present in an amount up to about 0.01, with the maximum samarium inclusion of about 0.01 requiring a minimum value for $x$ of about 0.03, and up to about 0.1 of the host lanthanum ions have been replaced by at least one ion selected from the group consisting of yttrium and gadolinum ions, said composition being characterized in containing a sufficient amount of alkali metal ion to enhance the brightness of said phosphor, there being up to 0.3% by weight of alkali metal ion in said phosphor.

9. A composition in accordance with claim 8 wherein said alkali metal ion is selected from the group consisting of sodium, potassium and lithium ions.

References Cited

UNITED STATES PATENTS

| | | | |
|---|---|---|---|
| 2,462,547 | 2/1949 | Pitha et al. | |
| 3,243,723 | 3/1966 | Van Uitert | 252—301.4 |
| 3,250,722 | 5/1966 | Borchardt | 252—301.4 |
| 3,257,327 | 6/1966 | Nassau | 252—301.4 |
| 3,418,247 | 12/1968 | Yocom. | |

TOBIAS E. LEVOW, Primary Examiner

R. D. EDMONDS, Assistant Examiner